United States Patent Office 3,232,979
Patented Feb. 1, 1966

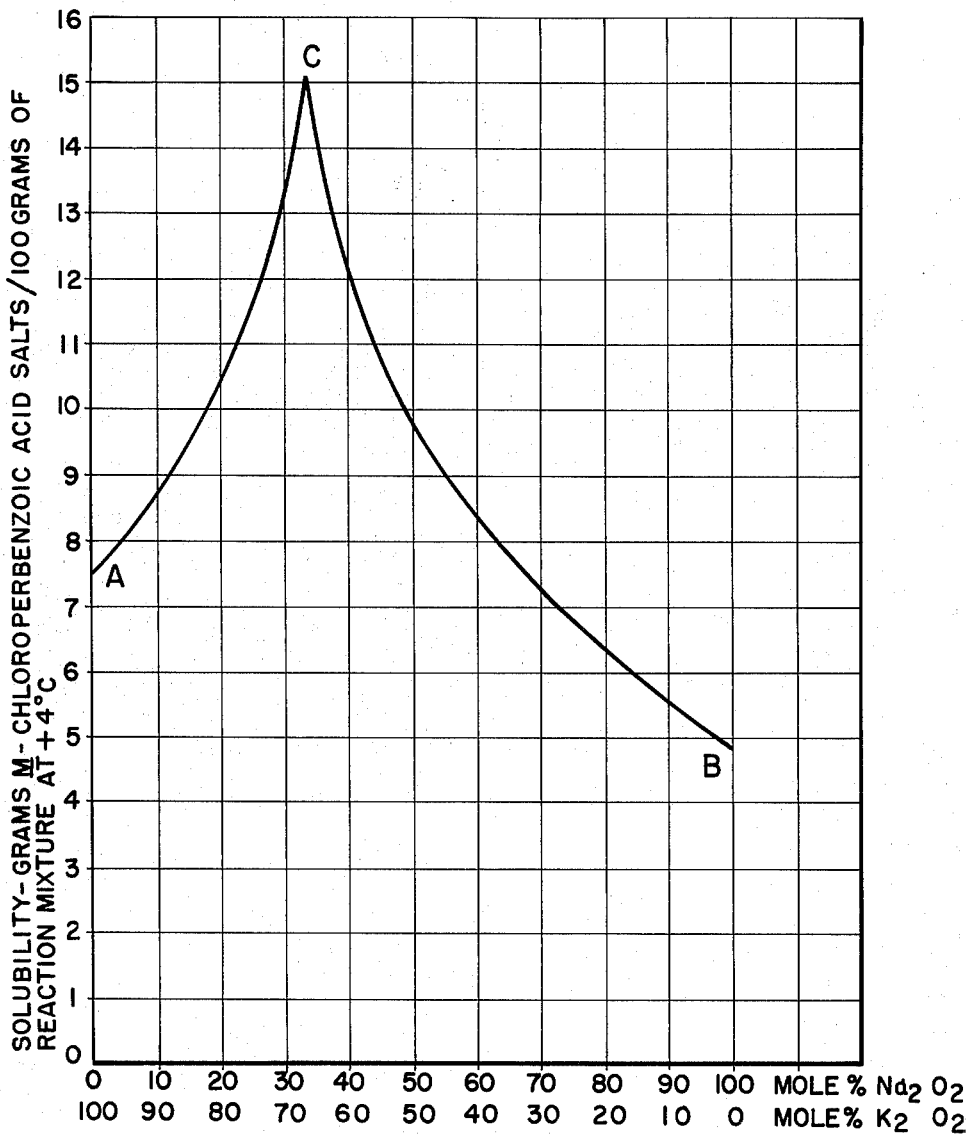

3,232,979
METHOD FOR PRODUCING AND RECOVERING ORGANIC PEROXY ACIDS
John H. Blumbergs, Highland Park, N.J., assignor to FMC Corporation, New York, N.Y., a corporation of Delaware
Filed Mar. 27, 1963, Ser. No. 268,243
4 Claims. (Cl. 260—502)

This invention relates to the preparation and recovery of organic peroxy acids by reaction of their precursor organic acyl halides or organic acyl anhydrides with aqueous alkaline hydrogen peroxide solutions.

One method for producing peroxy acids is by reacting an organic acyl halide or organic acyl anhydride with an alkali metal peroxide solution in the presence of a solvent. This reaction is illustrated by the following equation:

Equation 1

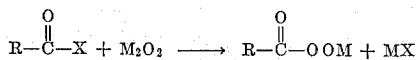

where R is an organic radical,
where X is a halogen atom,
where M is an alkali metal.

In my application Serial No. 197,282, filed May 24, 1962, entitled "Method for Producing Organic Peroxy Acids," of which this application is a continuation-in-part, there is taught the use of an aliphatic tertiary alcohol which is water-soluble in amounts of at least about 5% as a reaction promoter in the above process. These reaction promoters, such as tertiary butyl alcohol and tertiary amyl alcohol have been found to increase the yields of the peroxy acids and to decrease the time required for A serious problem in the process is the difficulty of recovering the peroxy acid from the reaction mixture. The final product of the reaction, as shown in Equation 1, is an alkali metal salt of the peroxy acid. This salt normally has only a limited solubility in the aqueous tertiary alcohol reaction medium, and therefore, precipitates and forms a thick slurry. Separation of the peroxy acid in my prior process has been carried out by (a) Adding large amounts of water sufficient to dissolve the peroxy acid salt, (b) Removing the tertiary alcohol solvent by either vacuum distillation or by extraction with a second organic solvent, (c) Acidifying the remaining aqueous solution containing the peroxy acid salt with a mineral acid to convert the peroxy acid salt to peroxy acid, (d) Precipitating the peroxy acid as water-insoluble crystals, (e) Separating the peroxy acid crystals from the aqueous mixture by extraction with an organic solvent, and (f) Purifying the peroxy acid by crystallizing it from the extracting solvent.

This procedure, while possible in laboratory purifications, is unacceptable for plant use because it requires several costly extractions with organic solvents, and because the original volume of the reaction medium must be increased several fold. Such a procedure on a plant scale would be economically prohibitive and unworkable.

It is an object of the present invention to prepare and recover organic peroxy acids, including aromatic, cycloaliphatic and aliphatic peracids, from a reaction mixture of water and a tertiary alcohol reaction promoter in a simple and economic manner, without employing organic extractions and without adding additional diluent to the reaction mixture.

These and other objects will be apparent from the following disclosure.

I have now found that the reaction of (a) Either the precursor acyl halide or the acyl anhydride of the peroxycarboxylic acid which is to be produced, with (b) An aqueous alkali metal peroxide solution having an active oxygen content of above about 1% by weight, in a reaction medium comprising (c) Water and a tertiary alcohol having a water solubility of above about 5% by weight, to form a peroxycarboxylic acid salt can be conducted so that upon acidification of the reaction mixture, there is formed a tertiary alcohol layer containing substantially all of peroxycarboxylic acid, separate from an aqueous layer which contains substantially no peroxycarboxylic acid but which contains the bulk of in situ produced inorganic salts, by employing a weight ratio of acyl halide or acyl anhydride to the tertiary alcohol of from about 1:2.0 to about 1:5 (and preferably from about 1:2.25 to about 1:3); by employing a weight ratio of the acyl halide or acyl anhydride to the total reaction mixture of from about 1:8 to about 1:15 (and preferably from about 1:9 to about 1:11); by employing in the aqueous alkali metal peroxide solution as the alkali metals, a mixture of potassium ions and sodium ions in a mole ratio of about 1:1 to about 6:1 (and preferably 1.5:1 to 2.5:1).

When these ingredients are reacted in the above-defined ratios, the peroxycarboxylic acid salts which are formed in the reaction mixture have been found to remain in solution, provided that the alkali metal peroxide solution which is employed as a reactant contains both potassium and sodium ions as defined above. The ability to maintain the peroxycarboxylic acid salts in solution in the reaction mixture at the termination of the reaction without the addition of material amounts of added diluents, e.g., water, is critical if a sharp separation of a tertiary alcohol liquid layer (containing the peroxy acid) from a water layer is to be obtained after acidification of the reaction mixture.

In order to best describe this solubility phenomenon, the solubility of both the sodium and potassium salts of m-chloroperoxybenzoic acid in the reaction medium is illustrated in the attached drawing. In the drawing, the solubility of the acid salts is plotted in grams of salt per hundred grams of reaction mixture against the mole percent of sodium peroxide and potassium peroxide in the reaction mixture. When the mole percent of sodium peroxide in the reaction mixture is zero, only the potassium salt of m-chloroperoxybenzoic acid is present in solution. This salt has been found to have a solubility of about 7½ g./100 g. of reaction mixture (point (a)). When the mole percent of potassium peroxide in the reaction mixture is zero, only the sodium salt of m-chloroperoxybenzoic acid is present in solution and it has a solubility of somewhat less than 5 g./100 g. of reaction mixture (point (b)). However, when an aqueous solution of sodium peroxide and potassium peroxide is present in the reaction mixture, both the sodium and the potassium m-chloroperoxybenzoic acid salts are present in the solution simultaneously, and the total solubility of a mixture of these salts in solution increases to as high as 15 g./100 g. of reaction mixture (point (c)). This increase occurs when the mole ratio of $K_2O_2/Na_2O_2$ is 2:1. This increased solubility obviates the prior practice of adding copious amounts of water to the reaction mixture to dissolve the peroxycarboxylic acid salt, thereby increasing the volume of the reaction mixture considerably. By keeping the ratio of water to tertiary alcohol in the reaction mixture within specified limits, the acidified reaction mixture separates into an upper tertiary alcohol layer and a lower water layer.

The function of the mixture of sodium and potassium ions in the reaction mixture is two-fold. Initially, it permits the peroxy acid salts to dissolve completely in the reaction mixture without additional aqueous diluent. Secondly, it permits the inorganic potassium and sodium salts to dissolve completely in the aqueous portion of the reaction mixture without the necessity of adding excess water of dilution over that normally employed in the reaction mixture. When either the sodium or potassium peroxy acid salt alone is employed instead of a mixture of both sodium and potassium salt, upon acidification, complete separation into an aqueous layer and a tertiary alcohol layer does not occur. In addition, when only a single peroxy acid salt is produced and the reaction mixture is acidified in the absence of added water, inorganic salts crystallize out throughout the entire reaction mixture, and further, prevent a complete separation of the tertiary alcohol layer from the water. By contrast, the production of mixed sodium and potassium peroxy acid salts results in the dissolution of these salts in the reaction medium prior to acidification, and after acidification, results in dissolution of the in situ produced inorganic salts in the aqueous layer.

In carrying out the process, the aqueous mixed alkali metal peroxide solution is prepared by mixing a dilute solution of sodium hydroxide and potassium hydroxide with a solution of hydrogen peroxide. The potassium hydroxide and sodium hydroxide must be in a mole ratio of from about 1:1–6:1 and preferably, within a mole ratio of 1.5:1–2.5:1. The total amount of sodium hydroxide and potassium hydroxide which is added to the solution should be at least sufficient to form the equivalent alkali metal peroxides with the added hydrogen peroxide.

Alternatively, the aqueous mixed alkali metal peroxide solution can also be prepared by dissolving a mixture of sodium peroxide and potassium peroxide in water, in which the molar ratio of the potassium peroxide to sodium peroxide is from about 1:1–6:1 and preferably 1.5:1–2.5:1. In either case, the resulting solution is identical. However, the former method is preferred for economic reasons because sodium peroxide and potassium peroxide are relatively expensive.

The above reaction mixture is maintained at temperatures of between about −10° C. to about 20° C. and preferably, at from 0° C.–5° C. Thereafter, an aliphatic tertiary alcohol (having a water solubility of at least 5% by weight) is introduced into the prepared aqueous mixed alkali metal peroxide solution as a reaction promoter and solvent. Subsequently, the desired acyl chloride or acyl anhydride is added slowly to the mixture with adequate cooling to prevent the exothermic reaction from raising the temperature of the mixture above the desired temperature. The resultant reaction is completed in from 15–60 min., depending on the reactivity of the acyl chloride or acyl anhydride employed. Upon completion of the reaction, the reaction mixture which is clear and contains little or no undissolved peroxy acid salt crystals or other salt crystals, is acidified by the addition of an acid, desirably a mineral acid such as sulfuric acid or phosphoric acid. The resulting acidified solution separates into an upper alcohol layer containing substantially all of the peroxycarboxylic acid, and a lower aqueous layer containing substantially all of the inorganic salts produced in situ. The yield of peroxycarboxylic acid recovered from the reaction mixture is high, being on the order of about 90% or above.

In the above process, the aqueous, mixed alkali metal peroxide solution should have active oxygen contents of about 1–3% by weight. Higher active oxygen contents can be employed, however, peroxide solutions having excessively high active oxygen contents should be avoided because they prevent the peroxy carboxylic acid salts from dissolving in the reaction mixture; substantially complete solution is necessary to facilitate recovery of the peroxycarboxylic acid from the residual reaction mixture. When the active oxygen content of the aqueous mixed alkali metal peroxide solution is lower than about 1%, the acyl chloride tends to hydrolize to the corresponding carboxylic acid and thus reduce the yield of the peroxycarboxylic acid product. At active oxygen contents above about 1%, the hydrolysis of the precursor acyl halide is virtually eliminated.

The aliphatic tertiary alcohols which have been found effective as reaction promoters in this process are those having water solubilities above about 5% by weight. The preferred tertiary aliphatic alcohols are tertiary butyl alcohol and tertiary amyl alcohol. The tertiary alcohol is employed in amounts of from about a 2.0:1 to about a 5:1 weight ratio with respect to the precursor acyl halide or anhydride. Larger amounts of the tertiary alcohol beyond the weight ratio of 5:1 are not preferred, since the increase in the tertiary alcohol content is obtained at the expense of using smaller amounts of water. Reduced amounts of water in the reaction mixture results in precipitation of the inorganic salt residues in the final reaction mixture, making separation of the tertiary alcohol layer from the aqueous layer difficult. If smaller amounts of tertiary alcohol than weight ratios of 2.0:1 with respect to the precursor acyl halide or acyl anhydride are employed, there is an insufficient amount of tertiary alcohol to dissolve the peroxycarboxylic acid product after acidification of the reaction mixture. The resulting insoluble crystals of the peroxy acid will prevent separation of the tertiary alcohol layer from the aqueous layer in the final reaction mixture; instead, a thick and unworkable slurry will result. Further, an insufficient amount of tertiary alcohol will not promote the reaction and will result in decreased yields. The preferred amounts of tertiary alcohol in the reaction mixture is in weight ratios of from about 2.25:1 to about 3:1 with respect to the precursor acyl halide or anhydride.

The organic acyl halides and acyl anhydrides which can be reacted according to this process are those containing aromatic, cycloaliphatic or aliphatic residues. These residues may be unsubstituted or substituted with groups such as halogens, $NO_2$, $C{\equiv}N$, or methoxy groups. The aromatic and cycloaliphatic residues can also be substituted with aliphatic groups. The halides or anhydrides can either be monobasic or dibasic. Monobasic carboxylic acid halides which can be employed include benzoyl chloride, isobutyryl bromide, naphthoyl chloride, octanoyl chloride, lauryl chloride, cyclohexanecarbonyl chloride and benzoyl bromide. Monobasic anhydrides which can be employed include benzoic acid anhydride, butyric anhydride and isobutyric anhydride. Dibasic anhydrides which can be employed include succinic anhydride, maleic anhydride and phthalic anhydride. Dibasic halides which can be employed include succinyl chloride, phthalyl chloride, sebacyl chloride and adipyl chloride. In addition, substituted carboxylic acid halides which can be reacted according to this process include chlorobenzoyl chloride, α-chlorolauryl chloride, nitrobenzoyl chloride, cyanobenzoyl chloride, methoxybenzoyl chloride and methylbenzoyl bromide.

The organic acyl halide or anhydride must be added to the reaction mixture in a weight ratio of from about 1:8 to about 1:15 with respect to the total weight of the final reaction mixture. If weight ratios lower than 1:15 are employed, the final reaction mixture, upon acidification, does not separate completely into a tertiary alcohol layer and an aqueous layer. If weight ratios higher than 1:8 are employed, the reaction mixture becomes oversaturated and unable to solubilize the salts. The preferred ratio of acyl halide or acyl anhydride to the total reaction mixture is in a weight ratio of from about 1:9 to about 1:11.

At the commencement of the reaction, the reaction medium can either be homogeneous or heterogeneous depending upon the solubility of the tertiary alcohol in water. In the case of tertiary butyl alcohol, for example, the reaction medium will be homogeneous, whereas with tertiary amyl alcohol, the reaction will be heterogeneous. During the major part of the reaction, some crystals of an intermediate product, such as benzoyl peroxide, will remain suspended in the reaction mixture. However, this intermediate converts, during the reaction, to the peroxycarboxylic acid salt which dissolves in the reaction medium. Accordingly, the final reaction mixture should be a liquid solution with little or no undissolved crystals.

The dissolved mixed alkali metal salts of the peroxycarboxylic acid are then converted to peroxycarboxylic acid by acidification with an acid such as sulfuric acid or phosphoric acid. Upon acidification, the reaction mixture separates into two layers, a tertiary alcohol layer and a lower water layer. The major portion of the peroxycarboxylic acid formed in the reaction (generally over 95%) dissolves in the upper tertiary alcohol layer, while the inorganic salt residues produced in situ dissolve in the lower aqueous layer. The tertiary alcohol layer is then decanted from the aqueous layer.

In the event that the organic peroxycarboxylic acid which is formed is not stable in a pure dry state, it can be stored in the form in which it is recovered, i.e., as a tertiary alcohol solution. If this is done, however, the tertiary alcohol solution should be cleansed by washing it with a 25% solution of $NaH_2PO_4$ or other water-soluble acidic salt, e.g., $NaHSO_4$ or $KH_2PO_4$, which can form an aqueous solution having a specific gravity greater than that of the alcohol solution for ease of separation. Alternatively, a solution of a weak acid, such as a 25% by weight aqueous phosphoric acid, can be employed to wash the alcohol solution. This washing removes the small amount of residual impurities present, such as unreacted hydrogen peroxide and inorganic potassium and sodium salts. In the absence of this washing, the tertiary alcohol does not stabilize the peroxy acid. If the organic peroxycarboxylic acid is stable in its dry state, it can be separated from the tertiary alcohol solvent by conventional means.

The process can be carried out either in a batch or in a continuous process. In a batch process, at the conclusion of the reaction, the reaction mixture is allowed to stand after acidification and the tertiary alcohol layer containing the peroxycarboxylic acid is removed by simple decantation. In the case of a continuous process, the feed reactants, i.e., the organic acyl halide or anhydride and the aqueous mixed alkali metal peroxide solution are added continuously to the reactor along with make-up tertiary alcohol. A portion of the reaction mixture is removed continuously from the reactor, acidified, and decanted to remove the tertiary alcohol layer. The tertiary alcohol is separated from the peroxycarboxylic acid by conventional methods and recycled to the reactor for additional use. In this manner, peroxycarboxylic acid is continuously produced from the reactor as product.

The following examples are given to illustrate the present invention and are not deemed to be limitative thereof.

EXAMPLE 1

The following three runs were made in an identical manner except as noted below.

*Run A (according to the present invention)*

In a 500 ml. 3-neck flask equipped with a laboratory stirrer, there was placed 5.4 g. sodium hydroxide and 17.8 g. of 85% by weight potassium hydroxide dissolved in 100 ml. of distilled water. The solution was then cooled to 4° C. and 13.6 g. of 50% hydrogen peroxide was added, followed by 84 g. of tert-butanol. Thereafter, 30 g. of m-chlorobenzoyl chloride was slowly added with sufficient cooling to maintain the temperature of the reaction mixture at from about 2-4° C. The mixture was subject to constant stirring and permitted to react at this temperature for one hour. At the end of this period, all the solids which were present after the addition of the acid chloride dissolved completely in the reaction mixture without the addition of any additional water. The reaction mixture was then analyzed for m-chloroperoxybenzoic acid and unreacted hydrogen peroxide by the method described in Anal. Chem. 20, 1061 (1948); it showed that 24.0 g. of m-chloroperoxybenzoic acid and 0.7 g. of unreacted hydrogen peroxide was present. No detectable amount of the intermediate product, m-chlorobenzoyl peroxide, was present in the solution.

The liquid reaction mixture was acidified with 15 g. of 85% phosphoric acid and then transferred to a separatory funnel. The acidified reaction mixture separated into two sharp liquid layers; the top layer, which weighed 132 g., contained 23.7 g. of m-chloroperoxybenzoic acid and trace amounts of $H_2O_2$ dissolved in tert-butanol. The bottom layer weighed 162 g. and contained 0.3 g. of m-chloroperoxybenzoic acid, 0.65 g. of unreacted hydrogen peroxide and all the inorganic salts produced in situ dissolved in water. Upon decantation of the tert-butanol layer from the remaining aqueous layer, approximately 99.0% of the m-chloroperoxybenzoic acid formed in the reaction was separated from the remainder of the reaction mixture.

*Run B (comparison with the present invention—sodium salt alone)*

The same procedure as Run A was carried out except that 16.2 g. of sodium hydroxide was used instead of the mixture of sodium and potassium hydroxide. After the addition of the acid chloride feed, the reaction mixture became a thick slurry which did not dissolve during the reaction time of 1 hr. At the end of this time, enough distilled water (1,200 g.) was added to the reaction mixture to dissolve the sodium m-chloroperoxybenzoate. After the addition of the water, the solution was found to contain small amounts of solids which were identified as the intermediate reaction product, m-chlorobenzoyl peroxide. This was removed by filtration because it is shock-sensitive when in a dry state. Thereafter, the filtrate which weighed 1452 g. was analyzed and was found to contain 28.1 g. of m-chloroperoxybenzoic acid and 1.07 g. of unreacted hydrogen peroxide. The reaction mixture was then acidified with 85% phosphoric acid as in Run A. The reaction mixture did not separate into two liquid layers as it did in Run A. Instead, a portion of the m-chloroperoxybenzoic acid crystallized to form a slurry. Thereafter, the slurry was extracted with benzene. The benzene layer was separated, dried, and the benzene removed by distillation under reduced pressure. The remaining crystalline solid was found to be m-chloroperoxybenzoic acid.

*Run C (comparison with present invention—potassium salt alone)*

The same procedure was carried out as in Run A except that 26.7 g. of 85% potassium hydroxide was used instead of the mixture of sodium and potassium hydroxides. After reaction for 1 hr., the mixture was a slurry. Distilled water (400 g.) was added to the slurry to dissolve the solids until a total of 656 g. of solution was present. This was found to contain 24.8 g. of m-chloroperoxybenzoic acid and 0.8 g. of unreacted hydrogen peroxide. The mixture was acidified with 15 g. of 85% phosphoric acid, but no separation of the liquid reaction mixture into layers occurred. Thereafter, recovery of the m-chloroperoxybenzoic acid was carried out in the same manner as Run B.

EXAMPLE 2

In a reaction vessel equipped with a Teflon stirrer (1,400 r.p.m.), was charged 1,050 g. of 50% sodium hydroxide solution, 3,030 g. of 50% potassium hydroxide solution and 6,350 g. of distilled water. The solution was cooled to 4° C. and 1,360 g. of 50% hydrogen peroxide was slowly added, followed by 7,000 g. of tert-butanol.

A total of 3,000 g. of technical grade m-chlorobenzoyl chloride, assaying 95.5%, was slowly added to the reaction mixture while maintaining the temperature at 2–5° C. The mixture was reacted for 1 hr. and was then subject to analysis as described in Example 1, Run A. The reaction mixture was found to contain 2,595 g. of m-chloroperoxybenzoic acid and 125 g. of unreacted hydrogen peroxide.

A small amount of the m-chloroperoxybenzoic acid salts was suspended in the solution as undissolved crystals at the end of the reaction because of the small proportion of water used in the make-up of the reaction liquor. This solution was acidified by the addition of 1,500 g. of 85% phosphoric acid dissolved in 3,000 g. of distilled water over a period of 8 min. with sufficient agitation and cooling to maintain the temperature in the reactor at from about 4–8° C. The added 3,000 g. of water adjusts the water content of the reaction mixture within optimum ratios. Stirring of the reaction mixture was then stopped and the mixture separated into two sharp liquid layers. The upper layer was found to be made up of tert-butanol containing 2,550 g. of m-chloroperoxybenzoic acid.

EXAMPLE 3

Using the same apparatus and equipment as employed in Example 2, 11,250 g. of a previously recovered tert-butanol-water mixture containing 51.5% by weight tert-butanol was charged into the reactor along with 1,260 g. of tert-butanol, 1,050 g. of 50% sodium hydroxide solution, 3,030 g. of 50% potassium hydroxide solution, and 840 g. of distilled water. The solution was cooled to 4° C. and 1,360 g. of 50% hydrogen peroxide solution was slowly added to the mixture followed by 3,000 g. of technical grade m-chlorobenzoyl chloride. The mixture was reacted for 1 hr. under the same conditions described in Example 2. Thereafter, the reaction solution was analyzed and was found to contain 2,690 g. of m-chloroperoxybenzoic acid and 124 g. of unreacted hydrogen peroxide. The reaction mixture was acidified and the product recovered in the same manner as described in Example 2. There was obtained a tert-butanol layer containing 2,660 g. of m-chloroperoxybenzoic acid.

EXAMPLE 4

In a 2 liter 3-neck flask equipped with a laboratory stirrer was charged 32.4 g. of NaOH, 106.8 g. of KOH (85%), 400 g. of distilled water, 81.6 g. of 50% hydrogen peroxide, 378 g. of tert-butanol and 144 g. of benzoyl chloride (99.0% assay). The same procedure as employed in Example 1, Run A, was repeated. The reaction mixture was a complete solution containing 130.9 g. of peroxybenzoic acid and 7.8 g. of unreacted hydrogen peroxide. Upon acidification with 90 g. of 85% phosphoric acid, the solution was transferred to a separatory funnel and separated into two sharp liquid layers. The upper layer weighing 590 g. was made up of tert-butanol, in which were dissolved 125.5 g. of peroxybenzoic acid and 1.12 g. of unreacted hydrogen peroxide. The lower layer, which weighed 716 g., contained 1.25 g. of peroxybenzoic acid and 6.6 g. of unreacted hydrogen peroxide along with the dissolved inorganic salts.

Forty grams of this crude peroxy acid solution (21.3% by wt.) was stored at room temperature to check its stability. The remainder was washed three times with 200-g. portions of a 25% solution of $NaH_2PO_4$-distilled water. There was obtained 508 g. of a tert-butanol solution containing 23.0% by weight of peroxybenzoic acid. The washed solution of peroxybenzoic acid was also stored at room temperature to check its stability.

At the end of three days, the unwashed solution of peroxybenzoic acid lost all of its active oxygen; by contrast, the washed solution, after two weeks at room temperature, still contained 23.0% by weight of the peroxybenzoic acid. The overall yield of peroxybenzoic acid was 90% of theoretrical.

EXAMPLE 5

The procedure of Example 1, Run A, was repeated except that 34.6 g. of hexanoyl chloride was charged into the reaction flask. Additionally, tertiary amyl alcohol was employed in place of tert-butanol. The reaction was carried out for 1 hr. at a temperature of from 2–4° C. Thereafter, the reaction solution was subject to analysis and found to contain 32.3 g. of peroxy-hexanoic acid and 2.0 g. of unreacted hydrogen peroxide. The solution was then acidified with 22.5 g. of 85% phosphoric acid and transferred to a separatory funnel where it separated into two sharp layers. The upper layer, which weighed 157 g., was made up of tertiary amyl alcohol in which was dissolved 31.5 g. of peroxyhexanoic acid and 0.29 g. of unreacted hydrogen peroxide. The lower layer, which weighed 193 g., was made up of water in which was dissolved 0.19 g. of peroxyhexanoic acid and 1.7 g. of unreacted hydrogen peroxide.

Thirty grams of the tertiary amyl alcohol solution was stored at room temperature to check its stability. The remainder was washed three times with 25 g. of a 25% solution of $NaH_2PO_4$ in distilled water. There was obtained 115 g. of the alcohol solution containing 21.8% by weight of peroxyhexanoic acid. After three days at room temperature, 65% of the peroxyhexanoic acid in the crude tertiary amyl alcohol solution was converted to hexanoic acid, while the solution purified with $NaH_2PO_4$ maintained its 21.8% by weight peroxyhexanoic acid.

The overall yield of peroxyhexanoic acid was 90% of theoretical.

EXAMPLE 6

This example was carried out in the same manner as Example 5 except that 37.7 g. of cyclohexane carbonyl chloride was used instead of the 34.6 g. of hexanoyl chloride. Additionally, tert-butanol was employed instead of tertiary amyl alcohol. At the termination of the 1-hr. reaction time, the reaction mixture was acidified and worked up as in Example 5. A 25-g. sample of unwashed tert-butanol solution containing 24.6% by weight of cyclohexane peroxycarboxylic acid was stored at room temperature to check its stability. The remaining tert-butanol solution was washed as in Example 5 and 110 g. of a purified tert-butanol solution was recovered containing 25.6% by weight of cyclohexane peroxycarboxylic acid. The overall yield of cyclohexane peroxycarboxylic acid was 92.5%.

After three days at room temperature, the crude peroxycarboxylic acid solution analyzed 8.1% of cyclohexane peroxycarboxylic acid, while the purified solution maintained its 25.6% by weight of the peroxy acid.

EXAMPLE 7

The procedure of Example 6 was repeated, except that 38.1 g. of phthalic anhydride was used instead of the 37.7 g. of cyclohexane carbonyl chloride. After 45 min. reaction time, the reaction solution contained 46.5 g. of monoperoxyphthalic acid and 1.6 g. of unreacted hydrogen peroxide. The reaction solution was then acidified with 60 g. of 85% phosphoric acid and separated into layers. There were obtained 192 g. of a tert-butanol layer, containing 43.1 g. of monoperoxyphthalic acid and 0.45 g. of unreacted hydrogen peroxide. The lower aqueous layer weighed 188 g. and contained 0.9 g. of monoperoxyphthalic acid and 1.1 g. of unreacted hydrogen peroxide. The overall yield of monoperoxyphthalic acid was 92%.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing a peroxycarboxylic acid by reaction of
   (A) a reagent selected from the group consisting of the acyl halide and the acyl anhydride of the peroxycarboxylic acid to be produced, with
   (B) an aqueous alkali metal peroxide solution having an active oxygen content of above about 1% by weight, in a reaction medium comprising
   (C) water and a tertiary alcohol having a water solubility of above about 5% by weight,
the improvement which comprises employing a weight ratio of said reagent (A) to said tertiary alcohol of from about 1:2.0 to about 1:5, a weight ratio of said reagent (A) to the total reaction mixture of from about 1:8 to about 1:15, and employing in said aqueous alkali metal peroxide solution, as the alkali metals, a mixture of potassium ions and sodium ions in the mole ratio of from about 1:1 to about 6:1, acidifying said reaction mixture, and removing a tertiary alcohol layer rich in said peroxycarboxylic acid from a water layer poor in peroxycarboxylic acid and containing the in situ produced inorganic salts.

2. Process of claim 1 in which the tertiary alcohol in said reaction medium (C) is tert-butanol, said weight ratio of said reagent (A) to tert-butanol is from about 1:2.25 to 1:3, said weight ratio of said reagent (A) to the total reaction mixture is from about 1:9 to 1:11, and the mole ratio of said potassium ions to said sodium ions in the aqueous alkali metal peroxide solution (B) is from about 1.5:1 to 2.5:1.

3. Process of claim 1, where said peroxycarboxylic acid is m-chloroperoxybenzoic acid.

4. Process of claim 1, where the tertiary alcohol solution of peroxycarboxylic acid is extracted with an aqueous solution of $NaH_2PO_4$, whereby inorganic salts, unreacted hydrogen peroxide and reaction impurities are removed from said solution of peroxycarboxylic acid and the storage stability of said acid solution is increased.

References Cited by the Examiner
FOREIGN PATENTS 1,177,466  4/1959  France.

LORRAINE A. WEINBERGER, *Primary Examiner.*

LEON ZITVER, *Examiner.*